United States Patent
Landgraf et al.

(10) Patent No.: US 12,499,614 B2
(45) Date of Patent: *Dec. 16, 2025

(54) MULTI-USER EXTENDED REALITY STREAMING METHOD AND SYSTEM

(71) Applicant: Holo-Light GmbH, Innsbruck (AT)

(72) Inventors: Philipp Landgraf, Altenmarkt a.d. Alz (DE); Alexander Werlberger, Haimhausen (DE)

(73) Assignee: Holo-Light GmbH, Innsbruck (AT)

( * ) Notice: Subject to any disclaimer, the term of this patent is extended or adjusted under 35 U.S.C. 154(b) by 182 days.

This patent is subject to a terminal disclaimer.

(21) Appl. No.: 18/453,871

(22) Filed: Aug. 22, 2023

(65) Prior Publication Data

US 2024/0070978 A1    Feb. 29, 2024

(30) Foreign Application Priority Data

Aug. 23, 2022   (EP) .................................. 22191746

(51) Int. Cl.
| | |
|---|---|
| G06T 15/50 | (2011.01) |
| G06F 3/01 | (2006.01) |
| G06T 19/00 | (2011.01) |
| H04L 65/60 | (2022.01) |

(52) U.S. Cl.
CPC ............ *G06T 15/503* (2013.01); *G06F 3/012* (2013.01); *G06T 19/006* (2013.01); *H04L 65/60* (2013.01); *G06T 2219/024* (2013.01)

(58) Field of Classification Search
CPC ................. G06T 15/503; G06T 19/006; G06T 2219/024; G06F 3/012; H04L 65/60
See application file for complete search history.

(56) References Cited

U.S. PATENT DOCUMENTS

| | | | |
|---|---|---|---|
| 2012/0162384 A1* | 6/2012 | Vesely ................... | G06F 3/012 348/47 |
| 2013/0169682 A1* | 7/2013 | Novak ............... | G06Q 10/1095 345/633 |
| 2020/0320795 A1 | 10/2020 | Dubnov et al. | |
| 2020/0349751 A1* | 11/2020 | Bentovim ................ | G09B 5/06 |
| 2021/0149190 A1* | 5/2021 | Johnson .................. | G06F 3/011 |
| 2021/0294560 A1* | 9/2021 | Vembar .................. | G06F 3/147 |
| 2022/0070235 A1 | 3/2022 | Yerli | |
| 2022/0292789 A1* | 9/2022 | Caswell ................ | G06T 19/006 |

OTHER PUBLICATIONS

EP Application No. 22191746.1, Extended European Search Report mailed Feb. 27, 2023, 8 pages.

* cited by examiner

Primary Examiner — Terrell M Robinson
(74) Attorney, Agent, or Firm — Gilliam IP PLLC

(57) ABSTRACT

A multi-user extended reality (XR) streaming method of streaming XR images between a plurality of XR application instances and at least one XR device is described. First XR images received from a first XR application instance are blended with second XR images received from a second XR application instance.

20 Claims, 2 Drawing Sheets

MULTI-USER EXTENDED REALITY STREAMING METHOD AND SYSTEM

FIELD OF THE DISCLOSURE

Embodiments of the present disclosure provide a multi-user extended reality (XR) streaming method of streaming XR images between a plurality of XR application instances and at least one XR device. Embodiments of the present disclosure further provide an XR streaming system.

BACKGROUND

In certain XR applications, XR images to be displayed on an XR device of a user are streamed from an XR application instance that is implemented in an external computer device to the at least one XR device.

The at least one XR device receives and displays the XR image stream, i.e. the XR images associated with the XR image stream are displayed on a display of the at least one XR device.

With use cases of XR devices becoming ever more complex, e.g. in the field of mechanical and electrical engineering, there is a need to expand the capabilities of XR streaming systems in order to address the increasing complexity.

Thus, there is a need for an XR streaming method and system that allow for more diverse use cases.

SUMMARY

The following summary of the present disclosure is intended to introduce different concepts in a simplified form that are described in further detail in the detailed description provided below. This summary is neither intended to denote essential features of the present disclosure nor shall this summary be used as an aid in determining the scope of the claimed subject matter.

Embodiments of the present disclosure provide a multi-user extended reality (XR) streaming method of streaming XR images between a plurality of XR application instances and at least one XR device. The XR streaming method comprises the steps of streaming, by means of a first XR application instance of the plurality of XR application instances, first XR images to the at least one XR device, wherein the first XR images streamed by the first XR application instance are associated with a first XR application;

streaming, by means of a second XR application instance of the plurality of XR application instances, second XR images to the at least one XR device, wherein the second XR images streamed by the second XR application instance are associated with a second XR application, wherein the second XR application is a multi-user XR application; and blending, by means of the at least one XR device, the first XR images received from the first XR application instance (26) with the second XR images received from the second XR application instance, thereby obtaining blended XR images to be displayed on the at least one XR device.

Therein and in the following, the term "XR device" is understood to denote an electronic device that is configured to display an extended reality (XR) image, i.e. an augmented reality (AR) image, a mixed reality (MR) image, and/or a virtual reality (VR) image.

For example, the at least one XR device may be a head-mounted display, e.g. an electronic wearable having the shape of glasses. However, it is to be understood that the at least one XR device may be established as any other XR-capable electronic device, e.g. as a smartphone or as a tablet.

Moreover, the term "XR image" is understood to denote at least one (partially) virtual image.

In the case of augmented reality or mixed reality, the XR image corresponds to at least one virtual image that is superimposed over reality.

For example, the at least one XR device may be a head-mounted display with a semi-transparent display, wherein the virtual image is displayed on the semi-transparent display, such that the user can directly see the environment through the semi-transparent display, but with the virtual image superimposed.

As another example, the at least one XR device may be a head-mounted display that is optically opaque. In this case, the head-mounted display may comprise at least one internal camera, particularly several internal cameras being configured to capture images of the environment of the head-mounted display. The real images captured by means of the internal camera are superimposed with the virtual image(s), and the resulting superposition of the real image(s) and the augmented reality image(s) is displayed on a display of the head-mounted display.

As another example, the at least one XR device may be a smartphone or a tablet, wherein an image captured by means of a camera of the at least one XR device is superimposed with the at least one virtual image, and the resulting image is displayed on a display of the at least one XR device.

In the case of virtual reality, the XR image corresponds to a virtual image being displayed on a display of the at least one XR device.

For example, the at least one XR device may be a head-mounted display that is optically opaque. The XR images, namely the VR images, may be displayed on a display of the head-mounted display.

Further, the term "XR application instance" is understood to denote suitable hardware, suitable software, or a combination of hardware and software that is configured to execute a certain XR application.

For example, the XR application may be an engineering application that is configured to generate XR images associated with a 3D model of an object, e.g. of a car, of an engine, or of any other object.

In a particular example, a car may be recognized in the at least one image captured by means of the at least one camera, and may be superimposed with a 3D model of the car.

However, it is to be understood that the XR application may be any other type of augmented reality, mixed reality, or virtual reality application, e.g. a game or a metaverse application such as a social hub that may have different accessible areas.

The term "multi-user XR application" is understood to denote an XR application that allows at least two users, in fact an arbitrary number of users, to interact with each other and/or with common virtual content.

In the context of the present disclosure, the term "blending" is understood to denote that the corresponding XR images are merged according to predefined rules, wherein the first XR images and/or the second XR images may be manipulated in a predefined manner in order to obtain the blended XR images, such that potential conflicts between the first XR images and the second XR images are mitigated.

Accordingly, the XR streaming method according to the present disclosure allows to simultaneously display XR images from different sources, namely from different XR application instances, wherein at least the second XR application is a multi-user XR application.

The XR streaming method according to the present disclosure is based on the idea to blend the XR images received from the XR application instances in a predefined manner, such that virtual content associated with both the first XR images and the second XR images can be displayed on the at least one XR device simultaneously.

In other words, the first XR images and the second XR images are not simply superimposed, but rather blended according to predefined rules, which ensures a pleasant user experience.

It has turned out that multi-user XR applications can be combined with single-user XR applications by means of the multi-user XR streaming method according to the present disclosure.

In other words, the first XR application instance does not necessarily have to be configured to support interaction of several users with each other or with common virtual content.

Instead, the XR images received from the XR application instances are blended as described above and hereinafter, such that the multi-user virtual content associated with the second XR application can be combined with the virtual content associated with the first XR application.

For example, the multi-user virtual content associated with the second XR application may be embedded in the virtual content associated with the first XR application, or vice versa.

Likewise, different multi-user XR applications do not have to be configured to be compatible with each other.

Instead, XR images received from the XR application instances are blended as described above and hereinafter, such that the multi-user virtual content associated with the second XR application can be combined with the multi-user virtual content associated with the first XR application.

Accordingly, the first XR application may be a single-user XR application or a multi-user XR application.

Further, conflicts between the first XR images and the second XR images are reliably avoided by means of the XR streaming method according to the present disclosure. In fact, display errors are reliably avoided.

It is to be understood that the XR streaming method according to the present disclosure is not restricted to blending of two XR image streams received from two XR application instances. In fact, an arbitrary number of XR image streams, e.g. two or more XR image streams, may be received by the at least one XR device from a plurality of XR application instances and may be blended as described above and hereinafter.

Several blending techniques are described hereinafter. It is to be understood that each of these blending techniques may be used exclusively. Alternatively, the different blending techniques may be combined arbitrarily.

According to an aspect of the present disclosure, the first XR images received from the first XR application instance are blended with the second XR images received from the second XR application instance by means of a positional blending technique based on an orientation of the at least one XR device and/or based on a location of the at least one XR device. Thus, the first XR images and the second XR images may be blended differently for different locations and/or for different orientations of the at least one XR device.

In other words, it is ensured that the virtual content associated with the first XR images and with the second XR images is correctly displayed on the at least one XR device depending on the location and/or orientation of the at least one XR device.

For example, if the at least one XR device is a head-mounted display, the orientation of the at least one XR device is directly correlated with a viewing direction of a user wearing the head-mounted display. Thus, the virtual content associated with the first XR images and with the second XR images may be displayed differently on the at least one XR device depending on the viewing direction of the user, as the first XR images and the second XR images are blended differently based on the orientation of the at least one XR device.

Particularly, the first XR images are blended with the second XR images based on a position of the at least one XR device, i.e. based on the location of the at least one XR device and based on the orientation of the at least one XR device.

For example, a sensor may be provided that detects the location and/or orientation of the at least one XR device, particularly of a reference point on the at least one XR device. For example, the reference point may be chosen such that the viewing direction of a user of the at least one XR device coincides with the orientation of the reference point, particularly if the at least one XR device is a head-mounted display worn by the user.

According to another aspect of the present disclosure, the XR application instances have respective priorities, wherein the XR images received from the XR application instances are blended based on the priorities of the XR application instances. Thus, for each pixel, the corresponding pixel of the XR image having the highest priority (i.e. of the XR image being generated by the XR application instance having the highest priority) is taken, if the XR image having the highest priority has a valid value for that pixel. For the remaining pixels, the corresponding pixel of the XR image having the second highest priority is taken, if the XR image having the second highest priority has a valid value for that pixel, etc.

Accordingly, the virtual content associated with the XR images received from the XR application instance having the highest priority may always be displayed. The virtual content associated with XR images having lower priorities may at least partially be concealed by the higher priority XR images.

In an embodiment of the present disclosure, pixels having a predefined cutout color are cut from the XR images by means of the XR device. Thus, pixels having the predefined cutout color do not have a "valid" value in the sense described above. In other words, the pixels having the predefined cutout color are removed from the XR images, such that XR images having lower priority may become visible.

For example, the predefined cutout color may be black, i.e. a pixel color value of 000000.

However, it is to be understood that the predefined cutout color may be any other color.

In a further embodiment of the present disclosure, alpha data is streamed to the at least one XR device by means of the first XR application instance and the second XR application instance, respectively. The alpha data comprises transparency information associated with the pixels of the XR images, wherein the first XR images received from the first XR application instance are blended with the second XR images received from the second XR application instance based on the alpha data. Thus, the color and transparency of each pixel of the blended XR images may be determined based on the color values and the alpha values of the corresponding pixel of the first XR images and of the second XR images.

In other words, the individual pixels of the first XR images and of the second XR images are merged based on their respective color value and based on their respective alpha value in order to obtain the blended XR images.

Particularly, the first XR images may be blended with the second XR images based on the alpha data and based on priorities of the XR application instances.

For example, the color values and/or the alpha values of XR images having higher priority may be weighed with a higher weighting factor than color values and/or the alpha values of XR images having lower priority in order to obtain the blended XR images.

Particularly, depth data is streamed to the at least one XR device by means of the first XR application instance and the second XR application instance, respectively. The depth data comprises depth information associated with the pixels of the XR images, wherein the first XR images received from the first XR application instance are blended with the second XR images received from the second XR application instance based on the depth data. Particularly, the depth data comprises information on the distance of each pixel of the corresponding XR image from the at least one XR device.

For example, each pixel of the blended XR images may be determined by comparing the depth information on the corresponding pixels of the first XR images and of the second XR images, wherein the corresponding pixel being closest to the XR device may be taken over for the blended XR images.

According to an aspect of the present disclosure, the first XR application and the second XR application are different from each other. Thus, XR images that are associated with different XR applications are blended, such that the blended XR images comprise virtual content associated with different XR applications. In other words, virtual content from different XR applications may be displayed on the at least one XR device, wherein it is not necessary that the different XR application instances interact with each other or are synchronized with each other.

As a particular example, the first XR application may be virtual social hub, i.e. the first XR images may correspond to a virtual environment, such as a virtual marketplace. The second XR application may be a multi-user engineering application that is configured to generate XR images associated with a 3D model of an object, e.g. of a car, of an engine, or of any other object. The second XR-application may allow several users to interact with the 3D model simultaneously. The 3D model may be embedded into the virtual environment generated by the first XR application by blending the XR images of both XR applications as described above and hereinafter, such that a user or several users can view the 3D model associated with the second XR application within the virtual environment associated with the first XR application.

In an embodiment of the present disclosure, the first XR application instance employs a first rendering engine, wherein the second XR application instance employs a second rendering engine, and wherein the first rendering engine is different from the second rendering engine. Thus, the blended XR images comprise virtual content that is rendered by means of different rendering engines. In other words, virtual content that is rendered by means of different rendering engines can be displayed on the XR device simultaneously.

For example, the first XR application instance may employ the "Unity" engine, while the second XR application instance may employ an "Unreal" engine.

According to another aspect of the present disclosure, momentary position data is determined, wherein the momentary position data is associated with a momentary position of the at least one XR device, wherein the momentary position data is forwarded to the first XR application instance and to the second XR application instance, and wherein the first XR application instance and the second XR application instance generate the XR images based on the momentary position data. Thus, it is ensured that the XR images are correctly rendered by means of the XR application instances, such that the virtual content to be displayed matches the location and/or orientation of the XR device.

Particularly, the at least one XR device comprises at least one position sensor, wherein the momentary position data is determined by means of the at least one position sensor. For example, the at least one position sensor may be established as a gyroscope, as an acceleration sensor, as a magnetometer, as a GNSS device, or as any other suitable type of position sensor.

Alternatively or additionally, the momentary position data may be determined by means of at least one external camera, particularly by means of an external stereo camera or several external cameras. The at least one external camera may be connected to an analysis circuit that is configured to determine the momentary position data based on images of the at least one XR device captured by means of the at least one external camera.

The analysis circuit may be integrated into the at least one XR device or into an external computer device.

In a further embodiment of the present disclosure, the momentary position data is forwarded to the first XR application instance and to the second XR application instance in a synchronized manner. Thus, it is ensured that the XR application instances render the XR images based on the same position data, such that the first XR images and the second XR images relate to the same position of the at least one XR device. Accordingly, all virtual content associated with the first XR images and the second XR images is correctly displayed with respect to the position of the at least one XR device.

For example, the momentary position data may comprise time stamps indicating the time at which the momentary position data is obtained.

Alternatively, the momentary position data is forwarded to the first XR application instance and to the second XR application instance in an unsynchronized manner, for example if no synchronization is necessary as the virtual contents rendered by the XR application instances does not have to be synchronized. Thus, no computational resources have to be dedicated to the synchronized transmission of the momentary position data, such that the necessary computational resources are reduced.

The at least one XR device may comprise at least one camera, wherein the momentary position data is associated with a position of the at least one camera. Thus, the momentary position data may comprise information on the position of the at least one camera. Particularly, an orientation of the camera may coincide with a viewing direction of a user of the XR device, particularly if the XR device is a head-mounted display worn by the user.

In an embodiment of the present disclosure, the momentary position data is determined relative to a spatial anchor. In general, the spatial anchor corresponds to a reference point in a real environment of the at least one XR device. By determining the momentary position data relative to the spatial anchor, coordinate systems of two or more XR devices can be synchronized with each other.

For example, this allows for displaying the virtual content associated with the first XR application and/or the virtual content associated with the second XR application on multiple XR devices at the same position within the real world.

The spatial anchor may be of any suitable type.

For example, the spatial anchor may be an optical code, such as a barcode or a QR code that is attached to an object in the real world.

As another example, the at least one XR device and/or an external electronic device may be configured to recognize an object on the real world, e.g. by means of an image processing technique. The recognized object may serve as the spatial anchor.

In an embodiment of the present disclosure, the first XR images are reprojected before blending. Alternatively or additionally, the second XR images are reprojected before blending. Thus, it is ensured that the corresponding virtual contents are correctly represented in the blended XR images even if the position of the at least one XR device changes rapidly and/or if XR images are missing in the first XR image stream or in the second XR image stream.

For example, the first XR images and/or the second XR images may be reprojected if they have been generated based on different position data corresponding to different positions of the at least one XR device. Thus, the first XR images and/or the second XR images may be reprojected such that the (reprojected) first XR images and the (reprojected) second XR images correspond to the same position of the at least one XR device.

Updated position data may be determined, wherein the updated position data corresponds to a position of the at least one XR device at a time at which the XR images are to be displayed. The first XR images and/or the second XR images may be reprojected based on the updated position data, particularly based on the momentary position data and based on the updated position data.

As another example, first XR images and/or the second XR images may be reprojected if one or several images of the first XR image stream and/or of the second XR image stream are missing. In other words, the missing images may be re-added into the corresponding XR image stream by reprojecting a respective preceding XR image.

According to an aspect of the present disclosure, XR image data associated with the XR images comprises information on a view matrix and/or a projection matrix. In general, the XR image to be displayed may comprise virtual, world-anchored objects, particularly virtual 3D objects. Accordingly, these objects may be defined in a fixed coordinate space having its origin in the environment of the at least one XR device. This coordinate space may also be called "world space".

The view matrix comprises all information necessary in order to transform objects from the world space to the view space, wherein the view space is associated with the at least one XR device, particularly with the at least one camera of the at least one XR device. In the view space, the at least one camera may rest at the origin, particularly wherein the main view direction of the at least one XR device and/or the at least one camera is along the z-axis.

In other words, the view matrix comprises all information necessary in order to transform the virtual objects, particularly the virtual 3D objects, such that these objects can be correctly displayed in view of the position of the at least one XR device.

Thus, as the location and orientation of the at least one XR device changes, the view matrix changes as well. Accordingly, the view matrix may be time-variant.

Particularly, the view matrix may be determined based on a determined momentary position of the at least one XR device or of the at least one camera of the at least one XR device.

Likewise, the view matrix may be determined based on a determined updated position of the at least one XR device or of the at least one camera of the at least one XR device.

The projection matrix comprises all information necessary in order to project objects from the view space into the projection space, wherein the projection space is associated with the at least one XR device, particularly with the at least one camera of the at least one XR device. In general, this projection of objects into the projection space allows to correctly display virtual (3D) objects on the at least one XR device.

Embodiments of the present disclosure further provide an extended reality (XR) streaming system. The XR streaming system comprises a plurality of XR application instances and at least one XR device. The plurality of XR application instances is connectable with the at least one XR device. The XR streaming system is configured to perform the multi-user XR streaming method described above.

Regarding the advantages and further properties of the XR streaming system, reference is made to the explanations given above with respect to the multi-user XR streaming method, which also hold for the XR streaming system and vice versa.

According to an aspect of the present disclosure, the plurality of XR application instances is implemented on a single server.

Alternatively, the XR streaming system may comprise a plurality of servers, wherein the plurality of XR application instances is implemented on the plurality of servers.

The different servers may be interconnected with each other, e.g. via a wide area network (WAN) or via the internet.

Particularly, different XR application instances that are implemented on a single server may be associated with different XR applications.

Different XR application instances that are implemented on different servers may be associated with the same XR application or with different XR applications.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

For the purposes of the present disclosure, the phrase "at least one of A, B, and C", for example, means (A), (B), (C), (A and B), (A and C), (B and C), or (A, B, and C), including all further possible permutations when more than three elements are listed. In other words, the term "at least one of A and B" generally means "A and/or B", namely "A" alone, "B" alone or "A and B".

Figure 1:
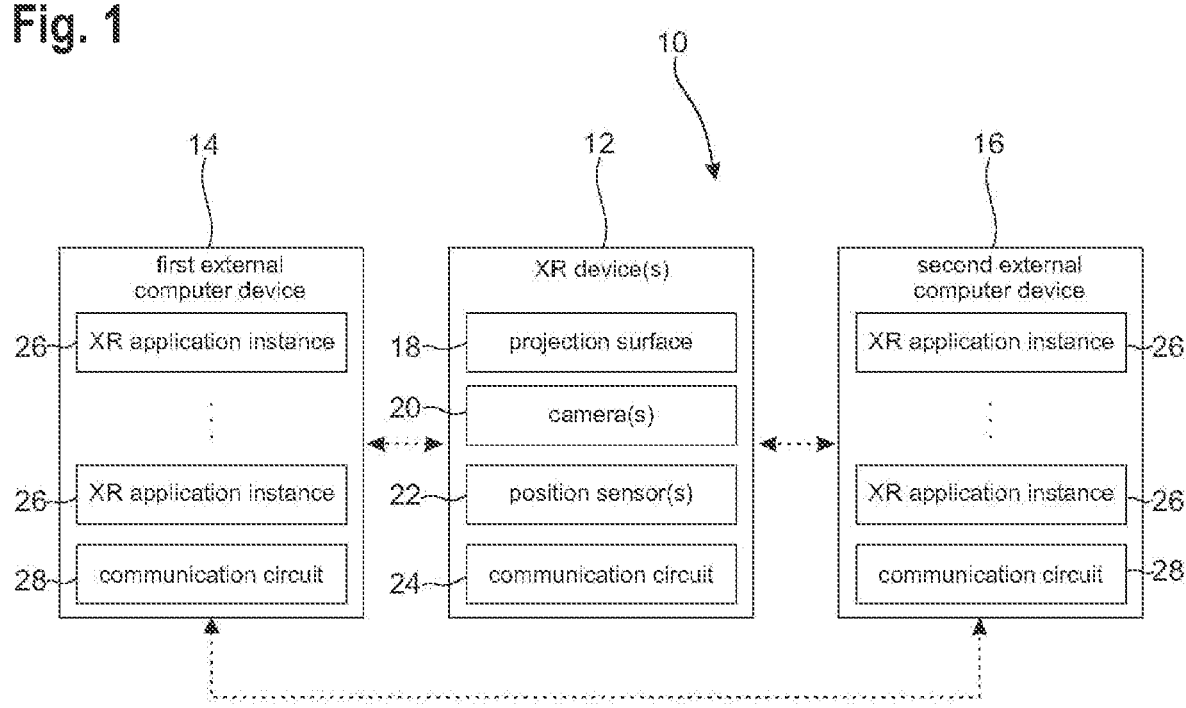
FIG. 1 schematically shows a block diagram of an XR streaming system according to the present disclosure.

FIG. 1 schematically shows a block diagram of an XR streaming system 10 comprising at least one XR device 12 and a first external computer device 14.

It is noted that, without restriction of generality, only a single XR device 12 is described in the following. However, it is to be understood that the explanations given hereinafter likewise apply to the XR streaming system comprising a plurality of XR devices being associated with a plurality of users.

As is indicated by the dashed arrow, the first external computer device 14 is connected with the XR device 12 in a signal-transmitting manner.

The XR streaming system 10 further comprises a second external computer device 16. The second external computer device 16 is connected with the XR device 12 in a signal-transmitting manner.

Therein and in the following, the terms "connectable", "connected", and "connected in a signal transmitting manner" are understood to denote a cable-based or wireless connection that is configured to transmit signals between the respective devices or components.

In general, the XR device 12 is an electronic device that is configured to display an extended reality (XR) image, i.e. an augmented reality (AR) image, a mixed reality (MR) image, and/or a virtual reality (VR) image.

Figure 2:
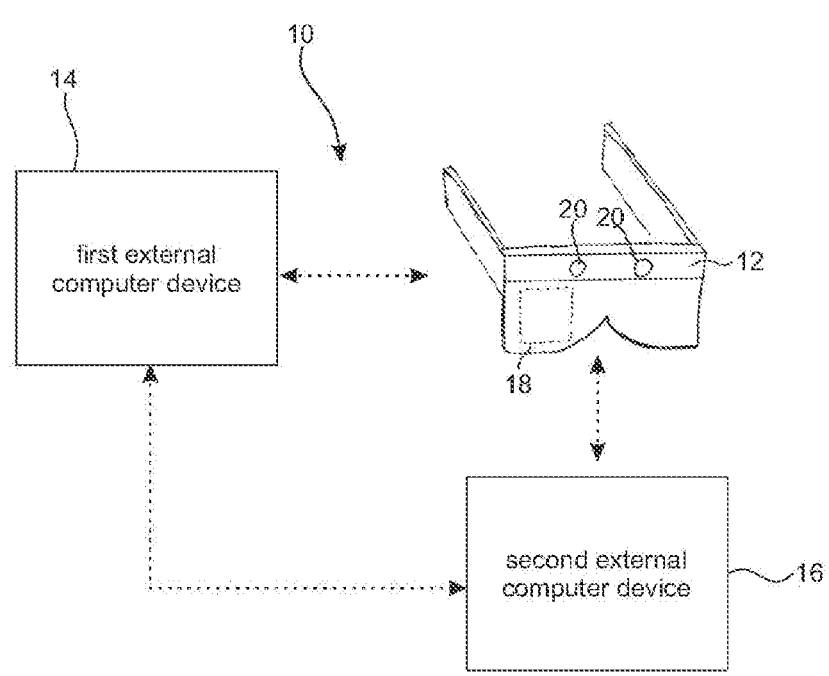
FIG. 2 schematically shows an exemplary embodiment of the XR projection system of FIG. 1.

As is illustrated in FIG. 2, the XR device 12 may, for example, be configured as a head-mounted display, particularly as an electronic wearable having the shape of glasses.

However, it is to be understood that the XR device 12 may be established as any other XR-capable electronic device, e.g. as a smartphone or as a tablet.

In general, the XR streaming system 10 allows a user to observe and/or interact with virtual objects, particularly virtual 3D objects, that are streamed from at least one of the external computer devices 14, 16 to the XR device 12.

If the XR streaming system 10 is an AR streaming system or an MR streaming system, these virtual objects are embedded into a real environment of the user.

Accordingly, the XR device 12 comprises at least one projection surface 18, wherein an XR image to be displayed is projected onto the projection surface 18, such that the virtual object is displayed to the user.

The projection surface 18 may be a display of the XR device 12.

Optionally, the XR streaming system 10 may comprise at least one handheld input device (not shown in FIG. 1), wherein the user may control the XR streaming system 10 by means of the at least one handheld input device.

For example, the at least one handheld input device may be established as a pen-shaped device, as a gamepad, or as any other type of suitable input device.

The XR device 12 further may comprise at least one camera 20, at least one position sensor 22, and/or a communication circuit 24.

Therein and in the following, the term "circuit" is understood to describe suitable hardware or a combination of hardware and software that is configured to have a certain functionality.

The hardware may, inter alia, comprise a CPU, a GPU, an FPGA, an ASIC, or other types of electronic circuitry.

The at least one camera 20 is configured to capture images of an environment of the XR device 12, particularly of an environment in front of the XR device 12.

Particularly, the at least one camera 20 may be established as a stereo camera. Alternatively or additionally, the XR device 12 may comprise several cameras with overlapping field of view. Thus, depth-information on images taken by the at least one camera 20 can be determined based on images taken by the at least one camera 20.

The at least one camera 20 may be operable in the visible light spectrum and/or in the infrared spectrum. For example, the XR device 12 may comprise at least one camera 20 being operable in the visible light spectrum, and at least one camera 20 being operable in the infrared spectrum.

The at least one position sensor 22 is configured to determine a position, i.e. a location and/or orientation of the XR device 12.

For example, the at least one position sensor 22 may be established as a gyroscope, as an acceleration sensor, as a magnetometer, as a GNSS device, and/or as any other suitable type of position sensor.

The XR device 12 may stream the determined position to the external computer devices 14, 16, such that an XR application or a plurality of XR applications running on the external computer devices 14, 16 takes the determined position of the XR device 12 into account.

In general, the first external computer device 14 and the second external computer device 16 may each be established as any type of electronic computing device that is configured to have the functionality described below.

For example, the external computer devices 14, 16 may be established as a personal computer, as a laptop, as a notebook, as a MAC, as a tablet, as a smartphone, or as any other type of smart device, respectively.

Preferably, the external computer devices 14, 16 are established as servers.

Without restriction of generality, it is assumed in the following that the external computer devices 14, 16 are established as servers.

The external computer devices 14, 16 may be interconnected with each other, e.g. via a wide area network (WAN) or via the internet.

The external computer devices 14, 16 each comprise a plurality of XR application instances 26, and a communication circuit 28.

In fact, an arbitrary number of external computer devices may be provided, each computer device comprising an arbitrary number of XR application instances 26.

Therein and in the following, the term "XR application instance" is understood to denote suitable hardware, suitable software, or a combination of hardware and software that is configured to execute a certain XR application.

For example, the XR application may be an engineering application that is configured to generate XR images associated with a 3D model of an object, e.g. of a car, of an engine, or of any other object.

In a particular example, a car may be recognized in the at least one image captured by means of the at least one camera of the XR device 12, and may be superimposed with a 3D model of the car.

However, it is to be understood that the XR application may be any other type of augmented reality, mixed reality, or virtual reality application, e.g. a game or a metaverse application, such as a social hub giving a plurality of users access to different XR applications.

The term "multi-user XR application" is understood to denote an XR application that allows at least two users, in fact an arbitrary number of users, to interact with each other and/or with common virtual content.

In general the XR application instances 26 of the external computer devices 14, 16 may be associated with the same or with different XR applications.

Without restriction of generality, it is assumed in the following that different XR application instances 26 are associated with different XR applications, respectively.

The communication circuit 24 of the XR device 12 and the communication circuits 24, 28 of the external computer devices 14, 16 are configured to communicate with each other.

In fact, image data, sensor data, position data and/or control data may be exchanged between the XR device 12 and the external computer devices 14, 16 by means of the communication circuits 24, 28.

Therein, any suitable wireless or cable-based transmission technique may be used by the communication circuits 24, 28, e.g. WLAN, 4G, 5G, Ethernet, etc.

Figure 3:
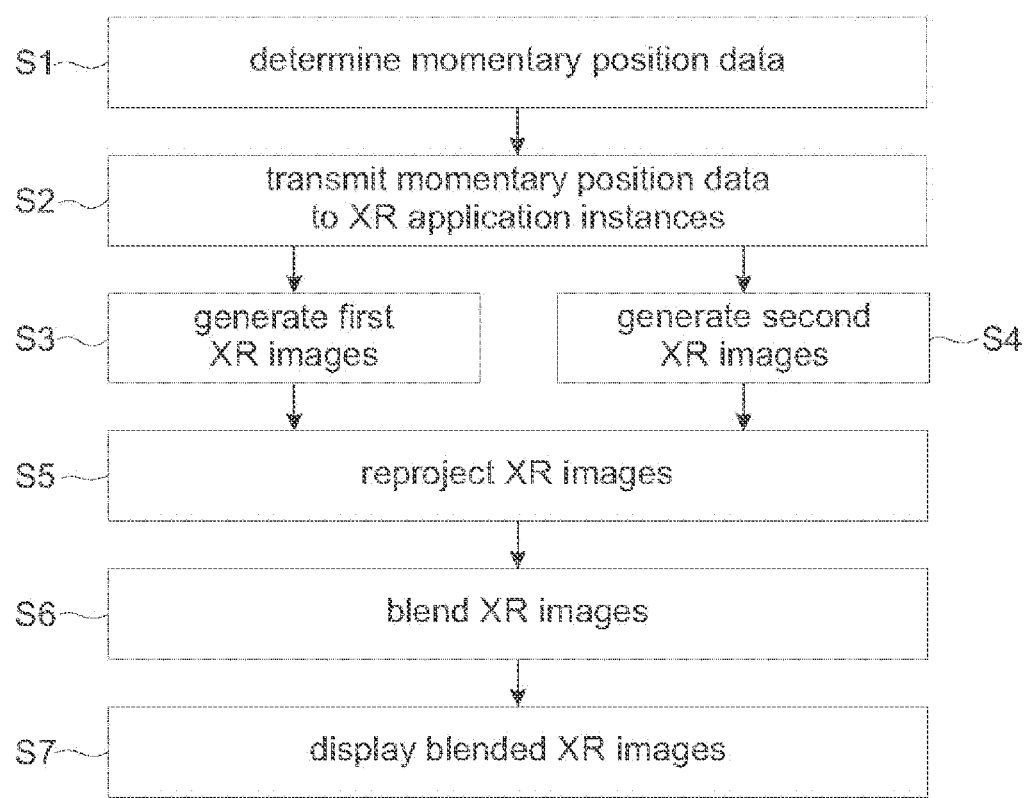
FIG. 3 shows a flow chart of an XR streaming method according to the present disclosure.

The XR streaming system 10 is configured to perform a multi-user XR streaming method for streaming XR images between the plurality of XR application instances 26 and the XR device(s) 12, which is described in the following with reference to FIG. 3.

Momentary position data is determined, wherein the momentary position data is associated with a momentary position of the XR device 12 (step S1).

In general, the momentary position data comprises information on a momentary location of the XR device 12 and/or information on a momentary orientation of the XR device 12.

Preferably, the momentary position data comprises information on the momentary location of the XR device 12 and information on the momentary orientation of the XR device 12, as this uniquely determines the field of view of a user of the XR device 12 or of the XR device 12 itself.

The momentary position data may be determined relative to a spatial anchor in the environment of the XR device 12.

In general, the spatial anchor corresponds to a reference point in the real environment of the at least one XR device 12. By determining the momentary position data relative to the spatial anchor, coordinate systems of two or more XR devices 12 can be synchronized with each other.

The spatial anchor may be of any suitable type.

For example, the spatial anchor may be an optical code, such as a barcode or a QR code that is attached to an object in the real world.

As another example, the at least one XR device and/or an external electronic device may be configured to recognize an object on the real world, e.g. by means of an image processing technique. The recognized object may serve as the spatial anchor.

The momentary position data may be determined by means of the at least one position sensor 22 of the XR device 12 and/or based on pictures captured by means of the at least one camera 20 of the XR device 12.

For example, the momentary position data may be determined based on measurements conducted by means of the at least one position sensor 22 and/or based on pictures of the spatial anchor captured by means of the at least one camera 20.

Alternatively or additionally, the momentary position data may be determined by means of at least one external camera, i.e. at least one camera that is not integrated into the XR device 12.

The momentary position data may be determined based on images of the XR device 12 captured by means of the at least one external camera. A corresponding analysis circuit that is configured to determine the momentary position data may be integrated into the XR device 12 or into the external computer device(s) 14, 16.

Optionally, the XR device 12 may comprise one or several light-emitting elements, particularly one or several LEDs. The analysis circuit may determine the momentary position data based on images of the one or several light-emitting elements captured by means of the at least one external camera, particularly via triangulation.

Further, it is also conceivable that the analysis circuit may determine the momentary position data based on images captured by means of the at least one camera 20.

The momentary position data is transmitted to at least two different XR application instances 26 via the communication circuits 24, 28 (step S2).

The momentary position data may be forwarded to the at least two different XR application instances 26 in a synchronized manner.

For example, the momentary position data may comprise time stamps indicating the time at which the momentary position data is obtained.

Alternatively, the momentary position data may be forwarded to the at least two different XR application instances 26 in an unsynchronized manner.

First XR images are generated by means of a first XR application instance 26 of the plurality of XR application instances 26, and are streamed from the first XR application instance to the XR device 12 (step 3).

Particularly, the first XR images are generated by means of the first XR application instance 26 based on the momentary position data received.

The first XR images are associated with a first XR application.

Second XR images are generated by means of a second XR application instance 26 of the plurality of XR application instances 26, and are streamed from the second XR application instance 26 to the XR device 12 (step S4).

Particularly, the second XR images are generated by means of the second XR application instance 26 based on the momentary position data received.

The second XR application instance 26 is different from the first XR application instance 26. In fact, the second XR images are associated with a second XR application, wherein the second XR application is a multi-user XR application that is different from the first XR application.

For example, the first XR application may be virtual social hub, i.e. the first XR images may correspond to a virtual environment, such as a virtual marketplace. The second XR application may be a multi-user engineering application that is configured to generate XR images associated with a 3D model of an object, e.g. of a car, of an engine, or of any other object. For example, the second XR application may allow several users to interact with the 3D model simultaneously.

It is to be understood that the explanations given above and hereinafter likewise apply to any other suitable XR applications.

Thus, at least the second XR application is a multi-user XR application.

The first XR application (and all further XR applications) may either be a single-user XR application or a multi-user XR application being different from the second XR application, respectively.

The first XR application instance 26 may employ a first rendering engine, while the second XR application instance 26 may employ a second rendering engine.

For example, the first XR application instance may employ the "Unity" engine, while the second XR application instance may employ an "Unreal" engine.

However, any other suitable rendering engine may be used.

XR image data associated with the XR images, i.e. with the first XR images and with the second XR images, may comprise information on a view matrix and/or a projection matrix.

In general, the XR images may comprise virtual, world-anchored objects, particularly virtual 3D objects. Accordingly, these objects may be defined in a fixed coordinate space having its origin in the environment of the XR device 12. This coordinate space may also be called "world space".

The view matrix comprises all information necessary in order to transform objects from the world space to the view space, wherein the view space is associated with the XR device 12, particularly with the at least one camera of the XR device. In the view space, the at least one camera 20 may rest at the origin, particularly wherein the main view direction of the XR device 12 and/or the at least one camera 20 is along the z-axis.

In other words, the view matrix comprises all information necessary in order to transform the virtual objects, particularly the virtual 3D objects, such that these objects can be correctly displayed in view of the position of the XR device 12.

Thus, as the location and orientation of the XR device 12 changes, the view matrix changes as well. Accordingly, the view matrix may be time-variant.

Particularly, the view matrix may be determined based on a determined momentary position of the XR device 12 or of the at least one camera 20 of the XR device 12.

Likewise, the view matrix may be determined based on a determined updated position of the XR device 12 or of the at least one camera of the XR device 12.

The projection matrix comprises all information necessary in order to project objects from the view space into the projection space, wherein the projection space is associated with the XR device 12, particularly with the at least one camera 20 of the XR device 12. In general, this projection of objects into the projection space allows to correctly display virtual (3D) objects on the XR device 12.

The first XR images and/or the second XR images may be reprojected (step S5).

In fact, the first XR images and/or the second XR images may be reprojected by the XR device 12, i.e. after transmission of the XR images to the XR device 12.

Alternatively, the, the first XR images and/or the second XR images may be reprojected by the first external computer device 14 and/or by the second external computer device 16, respectively, i.e. before transmission of the XR images to the XR device 12.

Any suitable technique may be used for reprojecting the XR images.

For example, the first XR images and/or the second XR images may be reprojected if they have been generated based on different position data corresponding to different positions of the XR device 12. Thus, the first XR images and/or the second XR images may be reprojected such that the (reprojected) first XR images and the (reprojected) second XR images correspond to the same position of the XR device 12.

Updated position data may be determined analogously to the momentary position data described above, wherein the updated position data corresponds to a position of the XR device 12 at a time at which the XR images are to be displayed on the projection surface 18.

The first XR images and/or the second XR images may be reprojected based on the updated position data, particularly based on the momentary position data and based on the updated position data.

As another example, first XR images and/or the second XR images may be reprojected if one or several images of the first XR image stream and/or of the second XR image stream are missing. In other words, the missing images may be re-added into the corresponding XR image stream by reprojecting a respective preceding XR image.

The first XR images, particularly the reprojected first XR images, and the second XR images, particularly the reprojected second XR images, are blended by means of at least one predefined blending technique, thereby obtaining blended XR images (step S6).

Several blending techniques are described hereinafter. It is to be understood that each of these blending techniques may be used exclusively. Alternatively, the different blending techniques may be combined arbitrarily.

Further, it is to be understood that different blending techniques may be used consecutively. For example, the first XR images may be blended with the second XR images using one blending technique, and the resulting XR images may be blended with third XR images using another blending technique.

In general, an arbitrary number of streams of XR images from an arbitrary number of XR application instances 26, e.g. two or more, may be blended as described above and hereinafter.

According to a first variant, the first XR images received are blended with the second XR images by means of a positional blending technique based on an orientation of the XR device 12 and/or based on a location of the XR device 12.

Thus, the first XR images and the second XR images may be blended differently for different locations and/or for different orientations of the XR device 12.

For example, if the XR device 12 is a head-mounted display, the orientation of the XR device 12 is directly correlated with a viewing direction of a user wearing the head-mounted display. Thus, the virtual content associated with the first XR images and with the second XR images may be displayed differently on the projection surface 18 depending on the viewing direction of the user, as the first XR images and the second XR images are blended differently based on the orientation of the XR device 12.

Particularly, the first XR images are blended with the second XR images based on a position of the XR device 12, i.e. based on the location of the XR device 12 and based on the orientation of the XR device 12.

According to a second variant, the XR application instances 26 have respective priorities, wherein the XR images received from the XR application instances 26 are blended based on the priorities of the XR application instances 26.

In other words, the XR images generated by different application instances 26 have respective priorities, wherein the XR images received from the XR application instances 26 are blended based on the priorities of the XR images.

Thus, for each pixel, the corresponding pixel of the XR image having the highest priority is taken, if the XR image having the highest priority has a valid value for that pixel.

For the remaining pixels, the corresponding pixel of the XR image having the second highest priority is taken, if the XR image having the second highest priority has a valid value for that pixel, etc.

Accordingly, the virtual content associated with the XR images received from the XR application instance 26 having the highest priority may always be displayed. The virtual content associated with XR images having lower priorities may at least partially be concealed by the higher priority XR images.

Optionally, pixels having a predefined cutout color are cut from the XR images by means of the XR device 12. Thus, pixels having the predefined cutout color do not have a "valid" value in the sense described above.

In other words, the pixels having the predefined cutout color are removed from the first XR images and/or from the second XR images in order to obtain the blended XR images, such that virtual content associated with XR images having lower priority may become visible.

For example, the predefined cutout color may be black, i.e. a pixel color value of 000000.

However, it is to be understood that the predefined cutout color may be any other color.

According to a third variant, alpha data is streamed to the XR device 12 by means of the first XR application instance 26 and the second XR application instance 26, respectively.

The alpha data comprises transparency information associated with the pixels of the XR images, wherein the first XR images are blended with the second XR images based on the alpha data.

Thus, the color and transparency of each pixel of the blended XR images may be determined based on the respective color values and the respective alpha values of the corresponding pixel of the first XR images and of the second XR images.

In other words, the individual pixels of the first XR images and of the second XR images are merged based on their respective color value and based on their respective alpha value in order to obtain the blended XR images.

Particularly, the first XR images may be blended with the second XR images based on the alpha data and based on priorities of the XR application instances 26.

For example, the color values and/or the alpha values of XR images having higher priority may be weighed with a higher weighting factor than color values and/or the alpha values of XR images having lower priority in order to obtain the blended XR images.

According to a fourth variant, depth data is streamed to the XR device 12 by means of the first XR application instance 26 and the second XR application instance 26, respectively.

The depth data comprises depth information associated with the pixels of the XR images, wherein the first XR images are blended with the second XR images based on the depth data. Particularly, the depth data comprises information on the distance of each pixel of the corresponding XR image from the XR device 12.

For example, each pixel of the blended XR images may be determined by comparing the depth information on the corresponding pixels of the first XR images and of the second XR images, wherein the corresponding pixel being closest to the XR device 12 may be taken over for the blended XR images.

The blended XR images are displayed on the XR device 12, particularly on the projection surface 18 (step S7).

Thus, the virtual content associated with the first XR images and with the second XR images is displayed on the XR device 12 simultaneously.

Therein, the first XR images and the second XR images are not simply superimposed, but rather blended according to predefined rules, which ensures a pleasant user experience.

The multi-user virtual content associated with the second XR application can be combined with the virtual content associated with the first XR application, wherein the first XR application does not have to be compatible with multi-user content.

Instead, the multi-user virtual content associated with the second XR application may be embedded in the virtual content associated with the first XR application, or vice versa.

Likewise, different multi-user XR applications do not have to be configured to be compatible with each other.

Instead, XR images received from the XR application instances are blended as described above and hereinafter, such that the multi-user virtual content associated with the second XR application can be combined with the multi-user virtual content associated with the first XR application.

Certain embodiments disclosed herein, particularly the respective module(s) and/or unit(s), utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about", "approximately", "near" etc., mean plus or minus 5% of the stated value.

The invention claimed is:

1. A multi-user extended reality (XR) streaming method of streaming XR images between a plurality of XR application instances and at least one XR device, wherein the XR streaming method comprises:
   determining momentary position data of the at least one XR device and forwarding the momentary position data to the plurality of XR application instances;
   streaming, from a first of the plurality of XR application instances, first XR images to the at least one XR device;
   streaming, from a second of the plurality of XR application instances, second XR images to the at least one XR device, wherein the second XR application instance is associated with a multi-user XR application;
   streaming first and second depth data to the XR device, wherein the first depth data are streamed to the XR device from the first XR application instance and the second depth data are streamed from the second XR application instance, wherein the first depth data comprise information of distances of pixels of the first XR images and the second depth data comprise information of distances of pixels of the second XR images as compared to the XR device in a virtual landscape; and
   blending, by the at least one XR device, the first XR images with the second XR images to obtain blended XR images to be displayed on the at least one XR device,
   wherein blending the first XR images received from the first XR application instance with the second XR images received from the second XR application instance comprises blending based on prioritizing each pixel of the blended XR images based on comparing the first depth data and the second depth data.

2. The multi-user XR streaming method of claim 1, wherein the first XR images received from the first XR application instance are blended with the second XR images received from the second XR application instance according to a positional blending technique that blends the first and second XR images based on an orientation of the at least one XR device and/or based on a location of the at least one XR device.

3. The multi-user XR streaming method according to claim 1, wherein the plurality of XR application instances have respective priorities, and wherein blending the first and the second XR images is based on the plurality of priorities of the XR application instances.

4. The multi-user XR streaming method according to claim 3, further comprising cutting out by the XR device those pixels of the first and second XR images pixels having a predefined cutout color, wherein blending comprises, for each of the pixels of the first and second XR images, taking the pixel with a valid value of the application instance having the highest priority, wherein cutting out a pixel comprises determining the pixel has an invalid value.

5. The multi-user XR streaming method according to claim 1, wherein alpha data is streamed to the at least one XR device from the first XR application instance and the second XR application instance, respectively, wherein the alpha data comprises transparency information associated with the pixels of the XR images, and wherein the first XR images received from the first XR application instance are blended with the second XR images received from the second XR application instance based on the alpha data.

6. The multi-user XR streaming method according to claim 1, wherein the first XR application instance employs a first rendering engine, wherein the second XR application instance employs a second rendering engine, and wherein the first rendering engine is different from the second rendering engine.

7. The multi-user XR streaming method according to claim 1, wherein the first XR application instance and the second XR application instance generate the XR images based on the momentary position data.

8. The multi-user XR streaming method of claim 1, wherein the momentary position data is forwarded to the first XR application instance and to the second XR application instance in a synchronized manner.

9. The multi-user XR streaming method according to claim 1, wherein the momentary position data is associated with a position of at least one camera of the at least one XR device.

10. The multi-user XR streaming method according to claim 1, wherein coordinate systems of a plurality of XR devices are synchronized based on momentary position data determined relative to a spatial anchor, wherein the spatial anchor comprises a reference point maintained in a real environment of at least one of the plurality of XR devices.

11. The multi-user XR streaming method according to claim 1, wherein the first XR images are reprojected before blending and/or wherein the second XR images are reprojected before blending.

12. The multi-user XR streaming method according to claim 1, wherein XR image data associated with the XR images comprises information on a view matrix and/or a projection matrix.

13. An extended reality (XR) streaming system, comprising:
   an XR device comprising a projection surface, a camera, communication circuitry, a processor, and one or more memories having stored therein instructions executable by the processor to cause the XR device to,
   determine momentary position data of the XR device;
   transmit, via the communication circuitry, the momentary position data to one or more servers implementing a plurality of XR application instances that corresponds to at least a first and a second XR application, wherein the second XR application is a multi-user XR application
   receive, via the communication circuitry, streams of XR images from the plurality of XR application instances that have rendered the XR images based, at least in part, on the transmitted momentary position data;
   receive, via the communication circuitry, streams of XR depth data, wherein the XR depth data comprises first depth data from a first XR application instance of the plurality of XR application instance and second depth data from a second XR application instance of the plurality of XR application instances, wherein the first depth data comprise information of distances of pixels of first XR images and the second depth data comprise information of distances of second XR images as compared to the XR device in a virtual landscape;
   blend the streamed XR images based, at least partly, on the first and second depth data, wherein the instructions executable by the processor to blend based on the first and second depth data further comprise instructions executable by the processor to blend the first XR images and the second XR images based on prioritizing each pixel of the blended XR images based on comparing the first depth data and the second depth data; and display the blended XR images on the projection surface.

14. The XR streaming system according to claim 13, further comprising the at least one or more servers.

15. The XR streaming system according to claim 13, wherein the one or more memories further have stored therein instructions executable by the processor to cause the XR device to cutout those pixels of the streamed XR images that have a predefined cutout color, wherein the instructions to blend the streamed XR images further comprise instructions executable by the processor to cause the XR device to take a pixel of a plurality of pixels of the streamed XR images corresponding to a highest priority if not cutout.

16. The XR streaming system according to claim 13 wherein the instructions executable by the processor to cause the XR device to determine momentary position data further comprise instructions executable by the processor to synchronize coordinate systems of a plurality of XR devices based on momentary position data determined relative to a spatial anchor, wherein the spatial anchor comprises a reference point maintained in a real environment of at least one of the plurality of XR devices.

17. A non-transitory computer readable memories comprising instructions to:
 determine momentary position data of an extended reality (XR) device;
 transmit the momentary position data to instances of a plurality of XR applications which includes at least one multi-user XR application;
 transmit first and second depth data, wherein the instructions to transmit the first and second depth data comprise instructions to transmit the first depth data from a first XR application instance of the plurality of XR application instances and the second depth data from a second XR application instance of the plurality of XR application instances, wherein the first depth data comprise information of distances of pixels of first XR images and the second depth data comprise information of distances of pixels of second XR images as compared to the XR device in a virtual landscape;
 blend XR images streamed from the plurality of XR application instances based on, depth data from the plurality of XR applications instances, wherein the instructions to blend the XR images comprise instructions to blend the first XR images and the second XR images based on prioritizing each pixel of the blended XR images based on comparing the first depth data and the second depth data; and
 display the blended XR images on a projection surface of the XR device.

18. The non-transitory computer readable memories of claim 17, wherein at least two different rendering engines are used by the plurality of XR applications instances and the plurality of XR applications instances render the XR images based, at least in part, on momentary position data of the XR device.

19. The non-transitory computer readable memories of claim 17, further comprising instructions to cutout those pixels of the streamed XR images that have a predefined cutout color, wherein the instructions to blend the streamed XR images further comprise instructions to, for each plurality of corresponding pixels across corresponding XR images of different streams, take the pixel corresponding to a highest priority if not cutout.

20. The non-transitory computer readable memories of claim 17, further comprising instructions to synchronize coordinate systems of a plurality of XR devices based on momentary position data determined relative to a spatial anchor, wherein the spatial anchor comprises a reference point maintained in a real environment of at least one of the plurality of XR devices.

* * * * *